United States Patent [19]

Williams

[11] Patent Number: 4,629,253
[45] Date of Patent: Dec. 16, 1986

[54] SEAT OCCUPANT-ACTIVATED UNDERSEAT SUPPORT AIR-CUSHION

[76] Inventor: Theodore M. Williams, 1360 Keneki Pl., Hilo, Hi. 96720

[21] Appl. No.: 818,959

[22] Filed: Jan. 15, 1986

[51] Int. Cl.⁴ .......................... A47C 1/00; A47C 27/08
[52] U.S. Cl. .................................... 297/452; 297/284; 297/453; 297/DIG. 3; 297/DIG. 8
[58] Field of Search ............... 297/284, 452, 453, 455, 297/DIG. 3, DIG. 8; 5/449, 455

[56] References Cited

U.S. PATENT DOCUMENTS

| | | | |
|---|---|---|---|
| 3,506,308 | 4/1970 | Fenton | 297/453 |
| 3,792,501 | 2/1974 | Kery | 297/DIG. 3 X |
| 4,145,083 | 3/1979 | Urban | 297/DIG. 3 X |
| 4,172,301 | 10/1979 | Everard et al. | 5/455 X |
| 4,444,430 | 4/1984 | Yoshida et al. | 297/284 |
| 4,514,010 | 4/1985 | Gonzalez | 297/DIG. 3 X |

FOREIGN PATENT DOCUMENTS

| | | | |
|---|---|---|---|
| 1405330 | 11/1968 | Fed. Rep. of Germany | 297/DIG. 3 |
| 2844628 | 4/1980 | Fed. Rep. of Germany | 297/DIG. 8 |
| 914505 | 10/1946 | France | 297/DIG. 8 |
| 191459 | 1/1923 | United Kingdom | 297/DIG. 3 |

Primary Examiner—Kenneth J. Dorner
Assistant Examiner—Peter R. Brown

[57] ABSTRACT

A seat occupant-activated underseat support air-cushion consisting of: a support base, an airtight expandable aircushion, resting in the support base, with the top of the air-cushion pressing upward against the bottom side of the vehicle seat cushion, with an air pump or pumps, disposed within, air-cushion which is provided with outside air-intake or intakes, air pump or air pumps arranged within to be normally expanded, filled with air on the beginning of the air pumps compression stroke in a manner so that any downward pressure by the seat occupant's weight would cause the pump or pumps to compress air, discharging it thru the pumps check valve into the air-cushion. Air-cushion to be equipped with an adjustable automatic air pressure regulating valve, discharging surplus air to exterior of air-cushion. Thus providing the seat occupant with an air-cushion ride, the constant motion of the moving vehicle to provide a continuing source of energy to operate the air-cushion.

3 Claims, 7 Drawing Figures

SEAT OCCUPANT-ACTIVATED UNDERSEAT SUPPORT AIR-CUSHION

SUMMARY

A primary object of this invention is to provide a new seat occupant-powered air-cushioned vehicle seat. This will reduce the stress and strain on vehicle passengers allowing them to travel more comfortably, thereby reducing fatigue and accidents.

Another object of this invention is to provide a supplemental occupant-powered air-ride cushioned seat to regular spring type vehicle seats. This will supply greater comfort and help prevent heavyweight persons from destroying the springs and eliminate subsequent sag in ordinary spring-type seats.

A still further object of this invention is to provide a means of driver and passenger safety and comfort without the use of direct energy from the vehicle's electrical or hydraulic systems thus resulting in a savings of energy and reducing enviromental pollution.

Various other objects and advantages of this invention will hereinafter become more fully apparent from the following description of the drawings, illustrating a presently preferred embodiment thereof, and wherein.

DESCRIPTION OF THE PREFERRED EMBODIMENT

Figure 1:
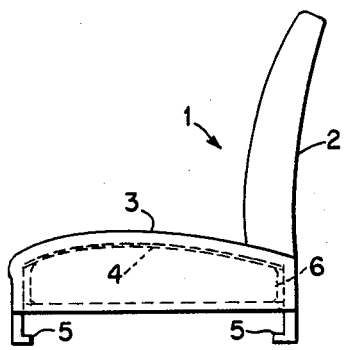
FIG. 1 is a side elevation of a conventional automobile seat.
Figure 3:
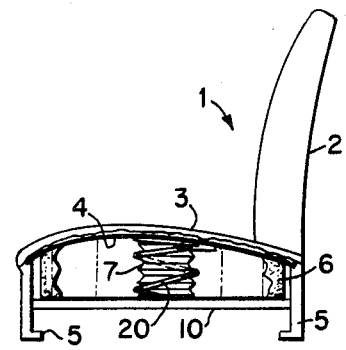
FIG. 3 is a side elevation of an automobile seat with support air-cushion in place.
Figure 4:
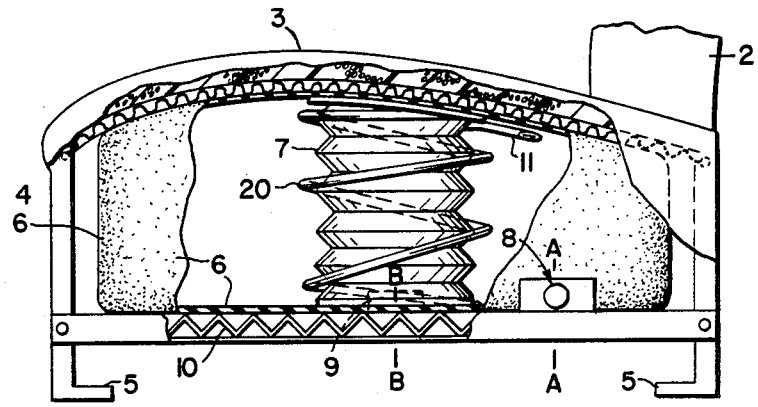
FIG. 4 is an enlarged fragmentary sectional view, primarily in elevation showing the components of the lower seat with support air-cushion in place.
Figure 6:
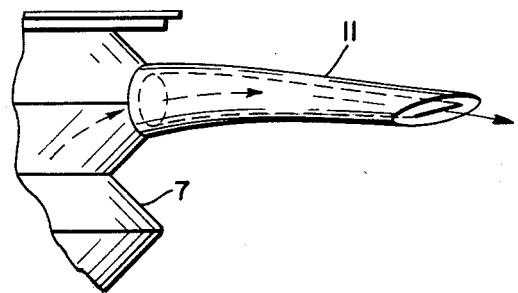
FIG. 6 is an enlarged detail view of the pump discharge check valve, Item 11.
Figure 7:
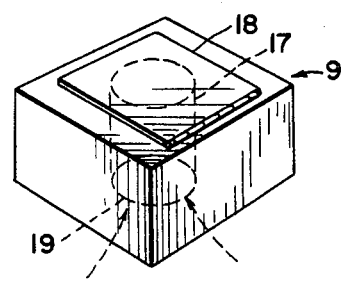
FIG. 7 is a detail sectional cutaway view of air intake valve, Item 9 best seen in FIG. 4 section B—B.

Referring more specifically to the drawings: the entire seat assembly is referred to as Item 1, best illustrated in FIG. 1. The back of the vehicle seat is Item 2. The seat bottom is Item 3 in FIG. 1. The horizontally disposed springs are Item 4 in FIG. 4. The seat legs are Item 5 as seen in FIG. 4. The flexible air-cushion under the vehicle seat is Item 6 seen in FIGS. 2, 3 & 4. The bellows type air-pump within the air-cushion is Item 7 best illustrated in FIG. 4. The air-pump Item 7 is activated by the weight of the occupants body moving or shifting slightly up and down as the vehicle is in motion. Item 8 is the regulating air-discharge valve on the air-cushion with its restricting and regulating means which is adjustable regulator to control airflow out of the air-cushion, making it firm, medium, or soft as adjusted by the regulating valve adjusting knob Item 16. Item 19 is the air-intake to the pump Item 7 best shown in FIGS. 4 and 7, with air-intake Item 19 connecting to outside of the air-cushion. Item 17 in FIG. 7 is an air passage way to the air intake pump valve Item 9 the air check reed valve Item 18 is mounted on top of the air intake valve item 9 shown in FIG. 7. Item 10 is the support member for the air-cushion, shown corrugated to allow free air passage to the air pump Item 7. seen in FIG. 4 Item 11 is the air-check valve that connects from the bellows pump Item 7 as shown is FIGS. 4 and 6. This flat discharge allows the air from inside of the air pump Item 7 to discharge into the air-cushion Item 6 and not flow back into the pump Item 7. FIG. 4, Item 20 is a coil spring thrusting upward keeping pump bellows normally streched upward against seat bottom Item 3, while at the same time thrusting downward against support member Item 10 thus assuring positive air pumping action.

Figure 2:
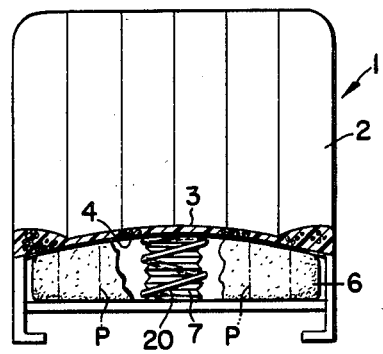
FIG. 2 is a front elevation of a conventional automobile seat with a support cushion in place.
Figure 5:
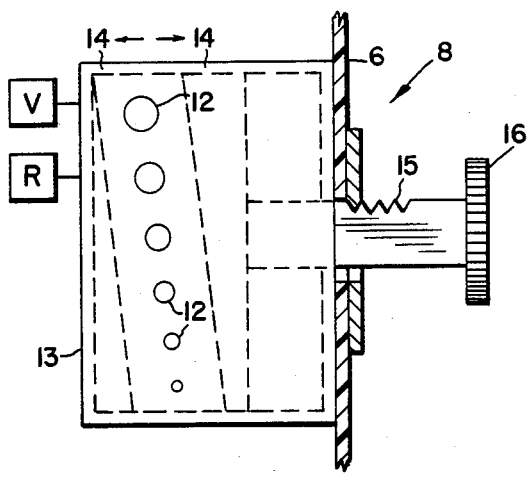
FIG. 5 is a plan view of air discharge regulating valve Item 8 showing details.

Item 12 is best viewed in FIG. 5. It is the opening from the air discharge valve of the air-cushion to outside of the air-cushion Item 6. The air volume is controlled by adjusting lever Item 15 attached to adjusting knob Item 16 located outside of cushion Item 6. Two retangular boxes in FIG. 5 marked V and R mean that any type of suitable valve may be used that can be adjusted to suitably regulate air discharge volume satisfactorily. The valve Item 8 has a volume adjusting regulator or Item 14 and the valve body is Item 13. Section A—A shows the placement of the valve Item 8, seen in FIG. 4. FIG. 7 shows the details of the pump intake valve Item 9 location in section B—B in FIG. 4. It allows air to enter air pump Item 7 and has been previously mentioned. However any suitable type of intake valve may be used as this valve's particular arrangement is not claimed in the invention. From the foregoing description, it becomes apparent that an air-cushion resting on a supporting member underneath it is capable of adding a comfortable support within a vehicle seat. It is also possible to, with the weight of the seat passenger moving upward and downward on the seat to operate the air pump and inflate the air-cushion under the seat to a regulated degree of air-ride comfort never before attainable with ordinary springs. This will make it possible for people to feel like they are truly riding on a cloud of air. Referring to FIG. 2 and FIG. 3. The retangular boxes marked "P" refer to additional air pumps if desired.

Various other modifications and changes are contemplated and may be restored to, without departing from the function or scope of the invention.

I claim as my invention:

1. An occupant-activated underseat support air-cushion, comprising: a support base means, an air-cushion resting on said support base means and having an air-pump inflation means contained therein, said air-pump inflation means having a one-way inlet from a source means exterior the air-cushion and a one-way outlet extending into the air-cushion, said air-pump inflation means activated by the weight of an occupant riding on said seat such that a downward force causes the air-pump inflation means to expel air into the air-cushion thereby increasing the pressure therein so as to counteract the downward force; said air-cushion further having an adjustable air-regulating means therein to enable an occupant to selectively adjust the pressure within said air-cushion.

2. An occupant-activated underseat support aircushion, according to claim 1 wherein said adjustable air regulator has a protruding adjustment knob.

3. An occupant-Activated underseat support air-cushion, according to claim 1, wherein the air pump inflation means contains a plurality of air-pumps.

* * * * *